United States Patent [19]

Hehl

[11] 3,833,204
[45] Sept. 3, 1974

[54] MOLDING MACHINE INJECTION UNIT

[76] Inventor: Karl Hehl, Siedlung 183, D-7291 Lossburg/Wurttemberg, Germany

[22] Filed: Nov. 15, 1972

[21] Appl. No.: 306,723

Related U.S. Application Data

[63] Continuation-in-part of Ser. No. 186,674, Oct. 5, 1971, Pat. No. 3,738,618.

[30] Foreign Application Priority Data

June 3, 1972  Germany............................ 2227133

[52] U.S. Cl. .............................................. 259/191
[51] Int. Cl. ............................................. B01f 7/24
[58] Field of Search ........... 259/191, 192, 185, 193, 259/21, 5, 9, 10, 25, 26; 425/245, 190, 191, 146, 192

[56] References Cited
UNITED STATES PATENTS

| | | | |
|---|---|---|---|
| 3,169,275 | 2/1965 | Compton | 259/191 |
| 3,204,294 | 9/1965 | Brochetti | 259/191 |
| 3,764,118 | 10/1973 | Matsuoka | 259/192 |

*Primary Examiner*—Robert W. Jenkins
*Attorney, Agent, or Firm*—Spencer & Kaye

[57] ABSTRACT

An injection unit for an injection molding machine in which selective ones of the hydraulic drive cylinders of the unit are provided with sleeve members on which the piston assemblies of those drive cylinders are mounted. These sleeves and those hydraulic cylinders which effect the movement of the injection unit relative to the injection molding machine are fastened to one of two supporting bridges while the hydraulic cylinders which effect a movement of a conveying worm of the unit relative to a plasticizing cylinder of the unit are fastened to the other of the supporting bridges. Each sleeve is moreover coaxially flanged to a respective one of the hydraulic cylinders which effect the movement of the injection unit relative to the injection molding machine, with the pistons of these cylinders being directly mounted on a respective one of the unit supporting struts.

8 Claims, 2 Drawing Figures

MOLDING MACHINE INJECTION UNIT

CROSS-REFERENCE TO RELATED APPLICATION

The present application is a continuation-in-part of my copending application Ser. No. 186,674, entitled INJECTION UNIT FOR AN INJECTION MOLDING MACHINE, filed on Oct. 5, 1971, now U.S. Pat. No. 3,738,618.

BACKGROUND OF THE INVENTION

The present invention relates to an injection unit for an injection molding machine and more particularly to structures for mounting and displacing the injection unit.

The injection unit disclosed and claimed in the above-mentioned copending application is mounted on supporting struts and is displaceable as a unit in the direction of an injection axis of the injection unit by means of a first hydraulic drive cylinder. The injection unit has a plasticizing cylinder within which a conveying worm is displaced. The conveying worm is held by one of two supporting bridges and is axially displaceable relative to the plasticizing cylinder by means of additional hydraulic drive cylinders. Sleeves are also provided and are fastened to one of the two supporting bridges. These sleeves, which enclose the supporting struts and are slidably mounted thereon, are provided with recesses in the area of their slide surfaces and support piston assemblies of the additional hydraulic cylinders. These additional hydraulic cylinders are disposed in the supporting bridge other than the one to which the sleeves are fastened.

An injection unit of this type provides a favorable basis for a mass production operation and permits, if required, an active return stroke of the conveying worm.

SUMMARY OF THE INVENTION

It is an object of the present invention to further simplify the production of an injection molding machine such as is disclosed and claimed in the aforementioned parent application.

This as well as other objects are accomplished according to the present invention by providing a plurality of first hydraulic drive cylinders equal in number to the additional hydraulic cylinders and by coaxially fastening the sleeves to the plurality of first hydraulic drive cylinders while disposing these drive cylinders within that supporting bridge to which the sleeves are fastened, the pistons of these drive cylinders being firmly mounted on the supporting struts.

One advantage of the improved injection unit according to the present invention is that the sleeves can be made substantially shorter than the sleeves disclosed in the above-mentioned application. In addition they simultaneously serve to form the cylinder covers for the plurality of first hydraulic drive cylinders. Furthermore, with the plurality of first hydraulic drive cylinders arranged in the supporting bridge which supports the conveying worm, it becomes possible to increase the injection pressure developed during the injection of plastic material into the mold because all of the hydraulic drive cylinders of the injection unit can be utilized to develope the desired increased injection pressure.

DESCRIPTION OF THE PREFERRED EMBODIMENTS

Figure 1:
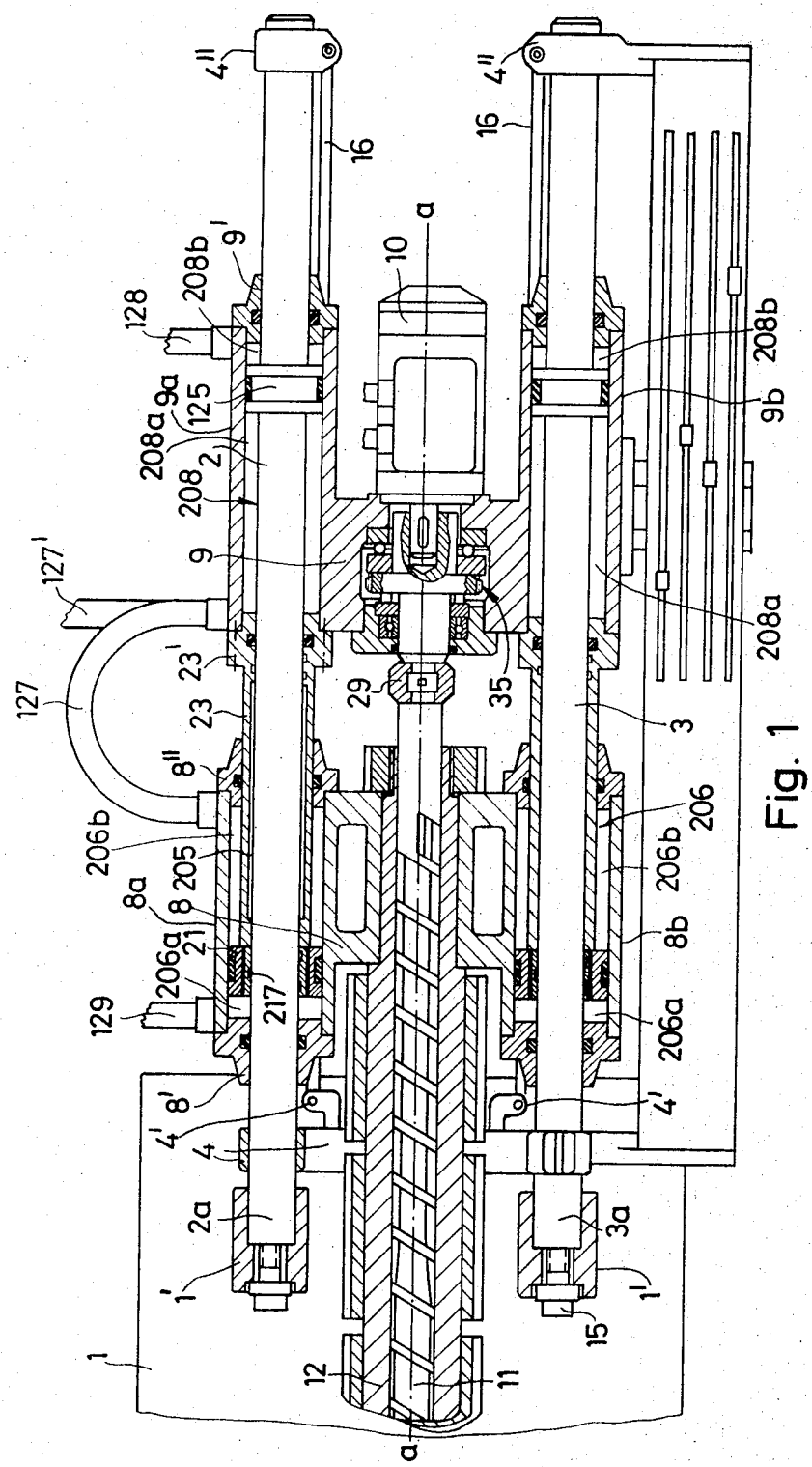
FIG. 1 is a cross-sectional plan view of one embodiment of the injection unit of the present invention.

In the embodiment shown in FIG. 1, supporting struts 2 and 3 of the injection unit are secured with their front ends 2a, 3a in plug-in connectors 1' of a stationary clamping plate 1 of a locking device of the injection molding machine of which the illustrated unit forms a part. They are there secured by means of coaxially disposed clamping screws 15.

A stabilization bridge 4 which is clamped to both supporting struts 2, 3 serves to stabilize the injection unit particularly when it is released from the clamping plate 1.

An optional feature which adds to the stabilization function of the bridge 4 is provided by the rods 16 which are attached at one end to lug joints 4' of the bridge 4 and at the other end to collars 4" which are mounted on the struts 2, 3.

Two supporting bridges 8 and 9 are provided and are both mounted on the struts 2, 3. The supporting bridge 8 supports a plasticizing cylinder 12, while the supporting bridge 9 supports a conveying worm 11, which is axially displaceable within the plasticizing cylinder 12, and a rotational drive unit 10, whose drive shaft is connected through an adapter assembly 35 and a safety coupling 29 with the conveying worm 11.

The injection unit is provided with two hydraulic drive units in the form of hydraulic drive cylinders, i.e., at least one first hydraulic drive cylinder and additional hydraulic cylinders. Preferably there are a plurality of first hydraulic drive cylinders equal in number to the additional hydraulic cylinders. The plurality of first hydraulic drive cylinders serve to displace the plasticizing cylinder 12 and conveying worm 11 as a unit relative to the injection axis $a$—$a$, that is, these drive cylinders serve to displace the injection unit as a whole relative to the clamping plate 1 in the direction of the axis $a$—$a$, while the additional hydraulic cylinders serve to displace the conveying worm 11 relative to the plasticizing cylinder 12 also in the direction of the injection axis $a$—$a$.

The actual cylinders 9a, 9b of the plurality of first hydraulic drive cylinders are disposed symmetrically to the injection axis $a$—$a$, and are formed as bores 208 in the supporting bridge 9. These actual cylinders 9a, 9b are covered at their axial ends by covers or cylinder heads 23' and 9'. The cover 23' is a flanged portion of a sleeve rod 23, which will be described in greater detail below.

Within the cylinders 9a and 9b are piston assemblies 125 which are mounted directly on the struts 2, 3. These piston assemblies 125 and the struts 2, 3 divide their respective cylinder chambers formed by the bores 208 into chambers 208a, 208b.

The actual cylinders 8a, 8b of the additional hydraulic cylinders are disposed symmetrically to the injection axis $a$—$a$ and are formed as bores 206 in the supporting bridge 8. These actual cylinders 8a, 8b are covered at their axial ends by means of cylinder covers or cylinder heads 8', 8''.

Sleeve rods 23 include flange portions 23' at one end which are fastened to the supporting bridge 9 so that the sleeves 23 are coaxially joined to the hydraulic drive cylinders 9a, 9b. The sleeves 23 extend into the bores 206 of the supporting bridge 8 and serve as piston rods for the piston assemblies 21 which are threadedly mounted to the piston rod sleeves 23. The piston assemblies 21, sleeves 23 and struts 2, 3 divide their respective cylinder chambers formed by the bores 206 into chambers 206a, 206b. The inner surfaces of sleeves 23 which slide on the outer surfaces of the supporting struts 2, 3 are provided with annular chamber type recesses 205. Thus the engageable surface area of the inner surface of the sleeves 23 which slide on the outer surface of the supporting struts 2, 3 is reduced and with it the resulting friction. These annular chamber-type recesses 205 also constitute an excellent lubrication recess for automatic lubrication. The latter results when the recesses 205 are in communication with the cylinder chambers 206a. This communication is advisably effected by helical lubricating grooves 217 also provided in the inner slide surfaces of the sleeves 23. In this case the annular chamber-type recess 205 acts as lubrication pockets. In the course of the constant relative movement between the supporting struts 2, 3 and the sleeves 23 the outer surfaces of the struts 2, 3 are automatically wetted by the pressurized oil preferably utilized and thus lubricated.

FIG. 1 shows the injection unit in a position in which plastic injection material has just been injected into the mold (not shown) and in which the nozzle opening of the injection unit is still in contact with the mold.

The operating cycle of the injection unit of FIG. 1 may vary depending on whether operation is effected, for example, with a continuously open nozzle configuration or with a locking nozzle configuration. In either case the injection unit as a whole is removed from the mold by charging the cylinder chambers 208b through a line 128, while line 127' is open and line 127 blocked, so that the pressurized oil in the cylinder chambers 208a is discharged through the line 127'. Thus relative movement between the conveying worm 11 and the plasticizing cylinder 12 is prevented.

In an injection unit with a continuously open nozzle a preplasticizing phase takes place during contact of the nozzle opening with the mold. Before or shortly after the nozzle is removed from the mold a relaxation or slight backward stroke of the conveying worm 11 occurs. The relaxation stroke is brought about by appropriately charging the chamber 206a through the line 129. The relaxation stroke assures that the plastic injection material will not spill out of the open nozzle when it is removed from the mold.

The compressive pressure build-up in the plastic injection material which collects in front of the rotating conveying worm 11 during the preplasticizing phase of the injection process is regulated or set, respectively, by controlling the speed of discharge of the pressurized oil from chambers 206b and 208a.

The movement of the injection unit as a whole in the direction toward the mold is effected by charging the cylinder chambers 206b, 208a through the lines 127' and 127. In this way the initial movement of the sleeves 23 will be relative to the cylinders 8a, 8b through a full stroke and then the cylinders 8a, 8b will move together with the cylinders 9a, 9b toward the mold. Alternatively, it may be desirable to charge only chambers 208a through line 127' and to block line 129 so that the pressurized oil in the chambers 206a cannot be discharged, thereby substantially preventing movement of the sleeves 23 relative to the cylinders 8a, 8b.

In this connection it should be noted that with a continuously open nozzle configuration no relative movement between the conveying worm 11 and the plasticizing cylinder 12 will take place when the injection unit is moved as a whole until it comes to rest on the mold, due to a certain jamming or stoppage between the conveying worm 11 and the plasticizing cylinder 12 in the granulate intake region of the injection unit.

For this reason also the preplasticized material will not spill out of the open nozzle during this time. Once the nozzle contacts the mold, the preplasticized material between the conveying worm 11 and the plasticizing cylinder 12 is sufficiently loosened and injection of the preplasticized material as well as further plasticized injection material is injected into the mold. In the case of a locked nozzle configuration, the nozzle is opened and the preplasticized material as well as further plasticized injection material is injected into the mold. The injection in either case comes about in the course of a further relative movement between the conveying worm 11 and the plasticizing cylinder 12.

The injection pressure for the conveying worm 11 developed during an injection stroke constitutes the sum of the driving forces resulting from the pressures developed in the hydraulic drive cylinders 8a, 8b and 9a, 9b. During the injection stroke, the chambers 206b and 208a are charged with the result that supporting bridge 9 is moved relative to the supporting bridge 8.

Since all of the hydraulic drive cylinders of the injection unit participate in the injection stroke there results a substantial increase in the injection pressure. The stroke of the piston assembly 21 is of a sufficient length so that charging the cylinder chamber 206a through the line 129 permits the conveying worm 11 to be removed from the plasticizing cylinder 12. In the process the pressurized oil escapes from the chambers 206b and 208a, while chambers 208b are filled with pressurized oil.

Figure 2:
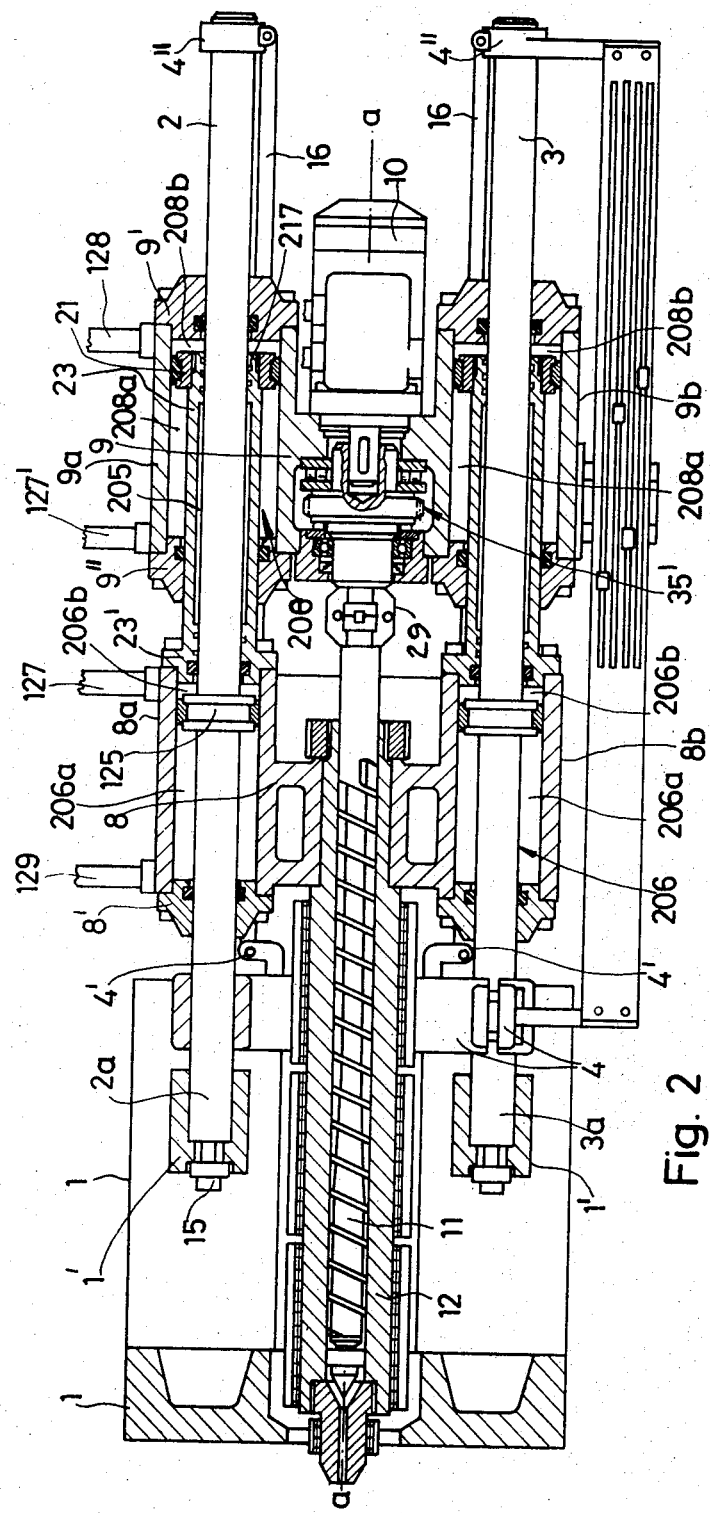
FIG. 2 is a cross-sectional plan view of another embodiment of the injection unit of the present invention.

The embodiment of FIG. 2 is analogous to that of FIG. 1, except that the position of the first hydraulic drive cylinders and the additional hydraulic cylinders is reversed, that is, the first hydraulic drive cylinders are disposed in the supporting bridge 8 and the additional hydraulic cylinders are disposed in the supporting bridge 9. The function of these two sets of hydraulic cylinders, although reversed in position, are the same as in the embodiment of FIG. 1. More specifically the first hydraulic drive cylinders primarily move the injection unit as a whole, while the additional hydraulic cylinders cause relative movement between the supporting bridges 8 and 9.

In the embodiment of FIG. 2, the sleeves 23 are fastened to the supporting bridge 8 to be coaxially joined to the cylinders 8a, 8b and to extend in the direction of the supporting bridge 9. These sleeves are also provided with recesses 205 and grooves 217 as in the embodiment of FIG. 1. According to the embodiment of FIG. 2, the hydraulic drive cylinders 8a, 8b effect the axial displacement of the injection unit as a whole during the placing onto and removal from the mold. The piston assemblies 125 and the struts 2 and 3 divide the bores 206 into cylinder chambers 206a, 206b. The ends of the bores are covered by the cylinder covers or cylinder heads 8' and sleeve flanges 23'. The hydraulic drive cylinders 9a, 9b, on the other hand effect the relative movement between the conveying worm 11 and the plasticizing cylinder 12. The bores 208 which are divided into cylinder chambers 208a, 208b by the piston assemblies 21, the sleeves 23 and the struts 2, 3 are provided with cylinder covers or cylinder heads 9', 9''.

FIG. 2 also shows the injection unit in a position in which the plastic injection material has just been injected into the mold and the nozzle opening of the injection unit is still in contact with the mold.

The injection unit is removed from the mold by charging the cylinder chambers 206b through the line 127, and moved toward the mold by charging the cylinder 206a through the line 129.

The relaxation stroke is effected by charging the cylinder chambers 208b through the line 128, while the compression pressure during the preplasticizing phase is controlled by controlling the speed of discharge of the pressurized oil from the cylinder chambers 208a.

The axial stroke of the conveying worm 11 required to inject thermoplastic plastic material into the mold is effected by charging the cylinder chambers 208a through the line 127' while feeding the cylinder chambers 208b through the line 128 permits the conveying worm 11 to be pulled substantially out of the plasticizing cylinder 12.

The adapter assembly 35' forms part of the assembly which connects the drive unit 10 to the conveying worm 11 and is similar to adapter assembly 35 of FIG. 1 with the exception of the type of bearing used.

It will be understood that the above description of the present invention is susceptible to various modifications, changes and adaptations, and the same are intended to be comprehended within the meaning and range of equivalents of the appended claims.

I claim:

1. In an injection unit, particularly for an injection molding machine for processing plastics, the injection unit defining an injection axis and including two supporting bridges, at least one first hydraulic drive cylinder, additional hydraulic cylinders, piston assemblies mounted within the hydraulic cylinders, supporting struts supporting both supporting bridges, the hydraulic drive cylinders, and the additional hydraulic cylinders, and a plurality of sleeves each having a slide surface enclosing and being slidably mounted on a respective supporting strut, each sleeve being provided with a recess in the area of its slide surface, and supporting the piston assemblies of the additional hydraulic cylinders, the plurality of sleeves being fastened to one of the supporting bridges and the additional hydraulic cylinders being fastened to the other of the supporting bridges, the improvement wherein there are a plurality of first hydraulic drive cylinders equal in number to said additional hydraulic cylinders, and wherein said first hydraulic drive cylinders are fastened to that supporting bridge to which the plurality of sleeves are fastened, with each sleeve being coaxially fastened to a respective one of said first hydraulic drive cylinders, and with the piston assemblies of said first hydraulic drive cylinders being mounted on a respective one of the supporting struts.

2. An injection unit as defined in claim 1, further comprising: a clamping plate to which the supporting struts are mounted; and a plasticizing cylinder and a conveying worm movable in the direction of the injection axis by said plurality of first hydraulic drive cylinders, and relative to each other by said additional hydraulic cylinders, both the plasticizing cylinder and the conveying worm being supported on the supporting struts.

3. An injection unit as defined in claim 1, wherein each sleeve further includes a flange portion coaxially fastening said sleeves to a respective one of said first hydraulic drive cylinders, and each flange portion constitutes a cylinder cover for the hydraulic drive cylinder to which it is fastened.

4. An injection unit as defined in claim 1, wherein the recesses of said sleeves are annular chamber-type recesses which serve as lubricating pockets, and each sleeve and the piston assembly mounted thereon divides the hydraulic cylinder chamber associated therewith into separate chambers with one of said chambers being in communication with its respective chamber-type recess.

5. An injection unit as defined in claim 4, wherein each sleeve further includes a helical groove in the area of the slide surface which connects the respective sleeve recess with the cylinder chamber.

6. An injection unit as defined in claim 1, wherein a first one of said supporting bridges has bores formed therein, and wherein the sleeves are fastened to the second of said supporting bridges and extend into a respective one of said bores of the first supporting bridge.

7. An injection unit as defined in claim 6, wherein each sleeve and the piston assembly mounted thereon divides the hydraulic cylinder chamber associated therewith into separate chambers, and each strut and piston assembly mounted thereon divides the hydraulic cylinder chamber associated therewith into separate chambers, and wherein a connecting line is provided for connecting adjacent ones of the separate chambers, said connected chambers being in different hydraulic cylinders.

8. An injection unit as defined in claim 1, wherein the sleeves are fastened to a first one of said supporting bridges and wherein the second one of said supporting bridges has bores formed therein, said sleeves extending into a respective one of said bores of the second supporting bridge.

* * * * *

UNITED STATES PATENT OFFICE
CERTIFICATE OF CORRECTION

Patent No. 3,833,204  Dated September 3rd, 1974

Inventor(s) Karl Hehl

It is certified that error appears in the above-identified patent and that said Letters Patent are hereby corrected as shown below:

In the heading of the patent, after line 9 (Foreign Application Priority Data), insert --October 5, 1970  Germany......... 2048796
   March 18, 1971  Germany......... 2112996--

Signed and Sealed this sixteenth Day of September 1975

[SEAL]

Attest:

RUTH C. MASON
*Attesting Officer*

C. MARSHALL DANN
*Commissioner of Patents and Trademarks*